(12) United States Patent
O'Shaughnessy et al.

(10) Patent No.: US 12,348,014 B2
(45) Date of Patent: Jul. 1, 2025

(54) AIRCRAFT SYSTEMS AND ELECTRICAL CONNECTORS

(71) Applicant: Airbus Operations Limited, Bristol (GB)

(72) Inventors: Paul O'Shaughnessy, Bristol (GB); Anthony Bryant, Bristol (GB); Scott Palmer, Bristol (GB); James Bird, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 154 days.

(21) Appl. No.: 17/910,563

(22) PCT Filed: Mar. 1, 2021

(86) PCT No.: PCT/EP2021/055046
§ 371 (c)(1),
(2) Date: Sep. 9, 2022

(87) PCT Pub. No.: WO2021/180504
PCT Pub. Date: Sep. 16, 2021

(65) Prior Publication Data
US 2023/0132687 A1    May 4, 2023

(30) Foreign Application Priority Data

Mar. 11, 2020   (GB) ...................................... 2003541

(51) Int. Cl.
*H02G 11/00*    (2006.01)
*B64C 9/14*     (2006.01)
*B64D 15/12*    (2006.01)

(52) U.S. Cl.
CPC ............... *H02G 11/00* (2013.01); *B64C 9/14* (2013.01); *B64D 15/12* (2013.01)

(58) Field of Classification Search
CPC .. B64C 9/12; B64C 9/22; B64D 15/12; H02G 11/00
See application file for complete search history.

(56) References Cited

U.S. PATENT DOCUMENTS 4,615,499 A  * 10/1986  Knowler ................ B64D 15/04
                                                  244/134 B
8,371,536 B2 *  2/2013  Soenarjo ................. B64C 9/22
                                                     244/214

(Continued)

FOREIGN PATENT DOCUMENTS

| EP | 2 397 404 | 12/2011 |
|----|-----------|---------|
| EP | 2 590 857 | 5/2013 |
| WO | 2012/004594 | 1/2012 |

OTHER PUBLICATIONS

International Search Report and Written Opinion of the ISA for PCT/EP2021/055046, dated May 10, 2021 (13 pages).

*Primary Examiner* — Michael H Wang
(74) *Attorney, Agent, or Firm* — Nixon & Vanderhye P.C.

(57) ABSTRACT

An aircraft system has a first structure, and a second structure coupled to the first structure and movable between first and second positions relative to the first structure. The aircraft system has an electrical connector for providing an electrical connection running between respective components housed within the first and second structures. The electrical connector has a cable harness housed within the first structure, and a connector body coupled to an end of the cable harness. The connector body extends through an aperture formed in the first structure, and the connector body is coupled to the second structure such that movement of the second structure between the first and second positions relative to the first structure causes the connector body to move through the aperture.

20 Claims, 7 Drawing Sheets

(56) References Cited

U.S. PATENT DOCUMENTS

| | | | |
|---|---|---|---|
| 2006/0038088 A1* | 2/2006 | Dodson | B64C 13/24 244/214 |
| 2008/0078879 A1* | 4/2008 | Weaver | B64C 9/22 244/131 |
| 2010/0130065 A1* | 5/2010 | Teague | H01R 41/00 439/640 |
| 2010/0193642 A1* | 8/2010 | Crepin | B64D 15/12 244/214 |
| 2011/0303792 A1* | 12/2011 | Blanchard | B64C 9/14 174/69 |

* cited by examiner

AIRCRAFT SYSTEMS AND ELECTRICAL CONNECTORS

RELATED APPLICATION

This application is the U.S. national phase of International Application PCT/EP2021/055046, filed Mar. 1, 2021, which designated the U.S. and claims priority to United Kingdom Patent Application GB 2003541.6, filed Mar. 11, 2020, the entire contents of each of which are hereby incorporated by reference.

TECHNICAL FIELD

The present invention relates to aircraft systems and electrical connectors for aircraft systems.

BACKGROUND

Aircraft systems may comprise many component parts, and at least some of those component parts may be movable relative to one another. It may sometimes be desirable to transfer electrical power between two such components, which may introduce challenges that can be exacerbated depending on the type of aircraft system and the type of relative motion required.

SUMMARY

A first aspect of the present invention provides an aircraft system comprising a first structure, a second structure coupled to the first structure and movable between first and second positions relative to the first structure, and an electrical connector for providing an electrical connection running between respective components housed within the first and second structures, the electrical connector comprising a cable harness housed within the first structure, and a connector body coupled to an end of the cable harness, the connector body extending through an aperture formed in the first structure, and the connector body coupled to the second structure such that movement of the second structure between the first and second positions relative to the first structure causes the connector body to move through the aperture.

This may be beneficial as the connector body is coupled to an end of the cable harness, the connector body extends through an aperture formed in the first structure, and the connector body is coupled to the second structure such that movement of the second structure between the first and second positions relative to the first structure causes the connector body to move through the aperture. In particular, this may enable the connector body to extend between the first and second structures whilst not requiring the cable harness to extend in a similar manner. This may allow the connector body to be designed specifically to cope with the requirements of being located between the first and second structure, whilst also allowing for a conventional cable harness to be used.

The connector body may be coupled to the harness such that the connector body extends substantially orthogonally relative to a principal direction of extent of the cable harness within the first structure.

The aircraft system may be configured so that the connector body follows a pre-defined path relative to the first structure when the second structure is moved between the first and second positions. For example, the connector body may comprise a rigid material, which may result in the connector body following a pre-defined path relative to the first structure when the second structure is moved between the first and second positions in use. This may provide a rigid component located between the first and second structures, which may allow for reliable performance and for the connector body to be located in a wide variety of environments. For example, the connector body may be exposed to airflow when the second structure is in the second position. The connector body may comprise a rigid outer shell. This may, for example, enable the connector body to be exposed to an airflow when between the first and second components in use. This may reduce the risk in path deviations negatively impacting an electrical connection provided by the electrical connector. The connector body may comprise a composite material.

The connector body may comprise an outer shell, and the outer shell may be a monolithic structure, i.e. a singular component. This may reduce the number of parts of the connector body, which may reduce cost.

The connector body may comprise an internal holding member for holding an electrical power cable. This may be beneficial as the internal holding member may be used to retain a fixed position of an electrical power cable within the connector body as the connector body moves relative to the first structure in use. This may provide a relatively stable arrangement, which may be particularly useful where the connector body is exposed to airflow in use. Where the harness comprises multiple electrical cables, the internal holding member may comprise a plurality of holding channels, with electrically insulative material located between the holding channels. This may enable the cables to be electrically isolated from one another within the connector body. The outer shell of the connector body may be overmoulded onto the internal holding member.

At least a portion of the connector body may be exposed between the first structure and the second structure when the second structure is in the second position. For example, at least 50% of a length of the connector body may be exposed between the first structure and the second structure when the second structure is in the second position. At least a portion of the connector body may extend through the aperture when the second structure is in the first position and when the second structure is in the second position. Thus, the connector body may fill at least a portion of the aperture both when the second structure is in the first position and when the second structure is in the second position.

The aircraft system may comprise a seal between the connector body and the perimeter of the aperture. This may prevent ingress of debris into the interior of the first structure via the aperture in use.

The second structure may be spaced further from the first structure when at the second position compared to the first position The connector body may comprise an aerodynamic shape that is exposed when the second structure is in the second position. For example, an outer surface of the connector body may comprise an aerodynamic shape. This may enable the connector body to be used in a scenario where air flows between the first and second structures in use. The aerodynamic shape may comprise a curved shape, for example an aerofoil shape.

The connector body may be fixedly coupled to the second structure. For example, a first end of the connector body may be fixedly coupled to the second structure. Thus, movement of the second structure relative to the first structure may cause movement of the connector body relative to the first structure in use. A first end of the connector body may be fixedly coupled to the second structure and a second end of the connector body may be slidably received within the aperture. This may reduce the number of fixings required for the electrical connector, thereby reducing component count and cost. The connector body may be slidable through the aperture. A first end of the connector body may be fixedly coupled to the second structure and a second end of the connector body may be supported by a perimeter of the aperture, for example supported by a perimeter of the aperture when the second structure is in both its first and second positions relative to the first structure.

The aircraft system may comprise a guide for restricting motion of the cable harness in at least one plane of motion during movement of the second structure between the first and second positions. This may be beneficial as the cable harness may have a relatively flexible nature when compared to the connector body. By providing a guide for restricting motion of the cable harness in at least one plane of motion during movement of the second structure between the first and second positions, motion of the cable harness may be restricted to ensure that the cable harness does not interfere with further components of the aircraft system in use. The cable harness may be substantially contained within the first structure, and the guide may restrict motion of the cable harness within the first structure. The guide may allow motion in each of the planes of motion, whilst restricting motion in at least one plane. The aircraft system may comprise a guide for restricting motion of the cable harness in at least two planes of motion during movement of the second structure between the first and second positions.

The guide may comprise a track housed within the first structure. The guide may allow motion of the cable harness that corresponds to motion of the second structure between the first and second positions. For example, the guide may allow the cable harness to sweep in a direction substantially corresponding to a direction of extent of the connector body in use.

The cable harness may be fixed relative to the first structure at a fixation point within the first structure, the fixation point being remote from the end of the cable harness which is coupled to the connector body. This may support the cable harness at the fixation point, which may prevent the cable harness from flexing to an unacceptable degree within the first structure. The fixation point may allow substantially no motion of the cable harness in at least two planes. For example, the fixation point may comprise a loop having a cross-sectional shape and size substantially corresponding to a cross-sectional shape and size of the cable harness.

A section of the cable harness between the fixation point and the connector body may held by the guide, for example such that a section of the cable harness between the fixation point and the connector body is allowed to sweep within the first structure when the second structure is moved from the first position to the second position, and vice versa.

The connector body may be curved, and a curvature of the connector body may correspond to a range of motion of the second structure as it moves between the first and second positions. This may be beneficial as it may allow for a smooth motion of both the connector body and the second structure as the second structure is moved between the first and second positions. A curvature of the connector body may correspond to a curvature of a track which defines motion of the second structure relative to the first structure.

The connector body may comprise a height and a width, wherein the height is greater than its width, for example with the height and width being generally perpendicular to a path along which the connector body moves during motion through the aperture. This may reduce a span of the connector body relative to the first structure.

The aircraft system may comprise a power cable and/or a signal cable that runs through the harness and/or the connector body. For example, the aircraft system may comprise a HVDC power cable and/or a data signal cable that run through the harness and/or the connector body. Thus, the electrical connector may enable transfer of one or both of power and signals between the first and second structures in use.

The connector body may comprise a connection portion, for example at an end of the connector body remote from the coupling to the cable harness. The connector portion may be housed within the second structure, for example such that a further cable harness within the second structure does not need to extend out of the second structure. The connector portion may comprise a plurality of different connection types, for example a HVDC connector portion and a signal connector portion.

The first structure may comprise a fixed wing structure, and the second structure may comprise a flight control surface coupled to the fixed wing structure. The first and second positions of the second structure may comprise retracted and deployed positions of the flight control surface. For example, the flight control surface may be movable between retracted and deployed positions relative to the fixed wing structure. Thus, the connector body may extend between the fixed wing structure and the flight control surface when the flight control surface is in a deployed position.

The second structure may comprise a heating device, and the electrical connector may provide an electrical connection from the first structure to the heating device. This may be beneficial as it may enable a heating device to be housed within a movable structure of an aircraft system. This may be particularly beneficial where, for example, the first structure comprises a fixed wing structure, and the second structure comprises a flight control surface coupled to the fixed wing structure. In particular, the heater may be used to prevent build-up of ice on the flight control surface during operation of an aircraft in use.

A second aspect of the present invention provides an aircraft system comprising a first body, a second body coupled to the first body and movable relative to the first body, and an electrical connector for providing an electrical connection between components respectively housed within the first and second bodies, the electrical connector comprising a harness housed within the first structure, a connector coupled to an end of the harness, and an electrical power cable running through the harness and the connector, the connector extending between the first body and the second body, and the connector coupled to the second body such that the connector is moved relative to the first body when the second body is moved relative to the first body.

A third aspect of the present invention provides an aircraft flight control surface electrical connector for electrically connecting a first component within an aircraft flight control surface to a second component within a fixed wing structure, the aircraft flight control surface electrical connector comprising a harness for location within the fixed wing structure, a connector body coupled to an end of the harness and couplable to the aircraft flight control surface, and an electrical power cable running through the harness and the connector body.

A fourth aspect of the present invention provides an aircraft comprising an aircraft system of the first aspect or the second aspect, or an aircraft flight control surface electrical connector of the third aspect.

Preferential features noted above of aspects of the present invention noted above may be equally applied to other aspects of the present invention noted above, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
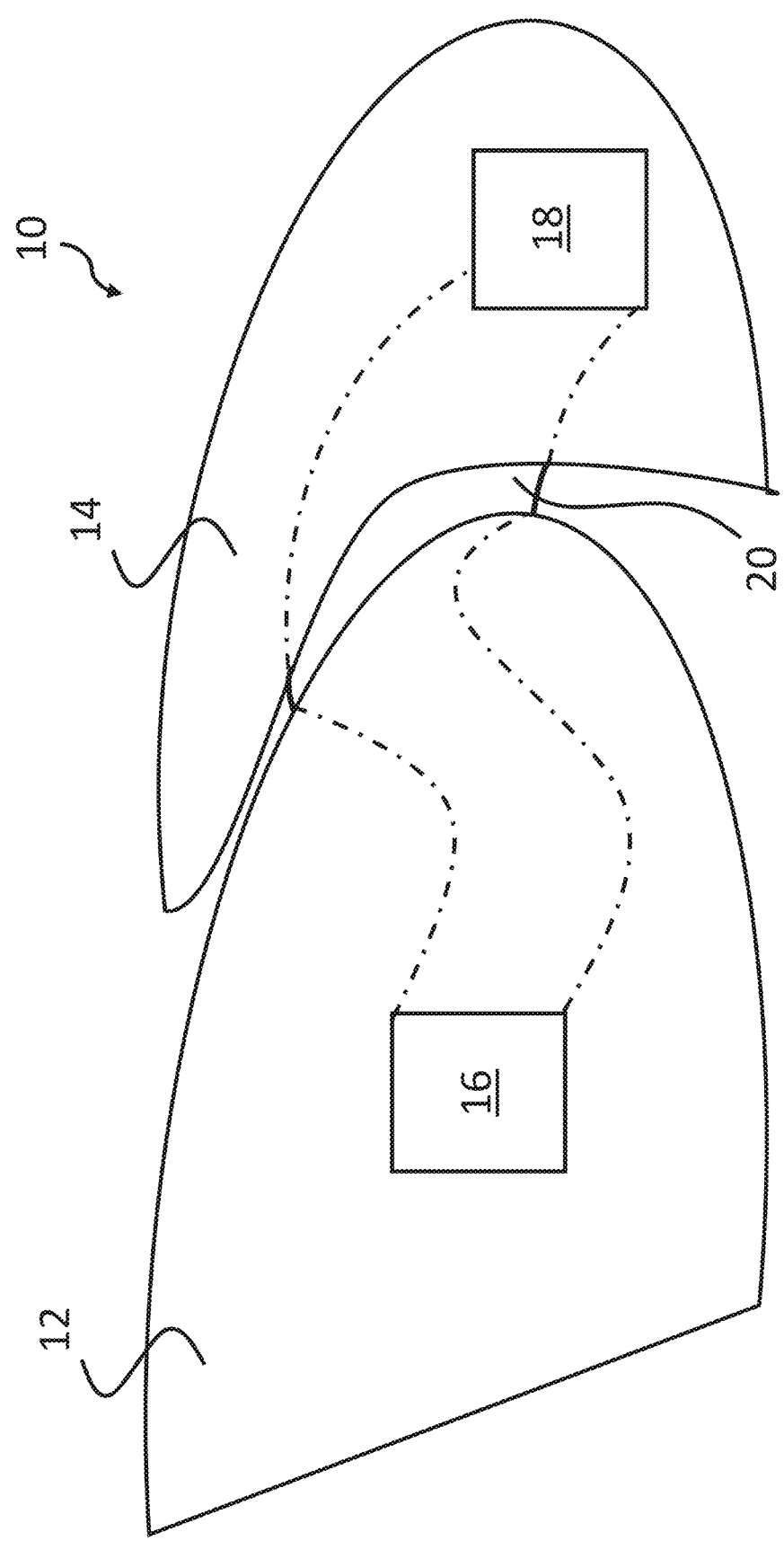
FIG. 1 shows a schematic view of a first configuration of an aircraft system according to an example.
Figure 2:
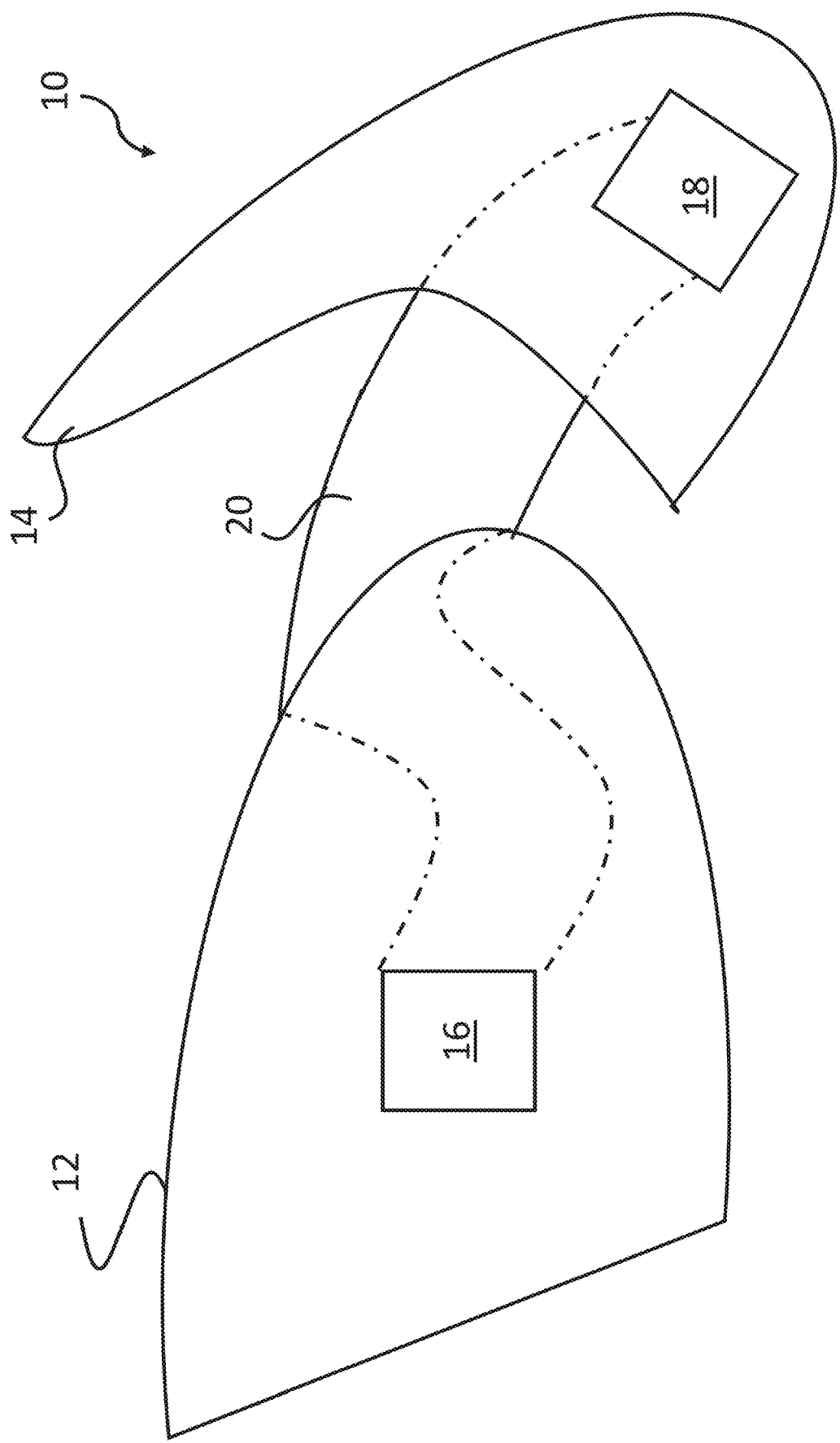
FIG. 2 shows a schematic view of a second configuration of the aircraft system of FIG. 1.
Figure 3:
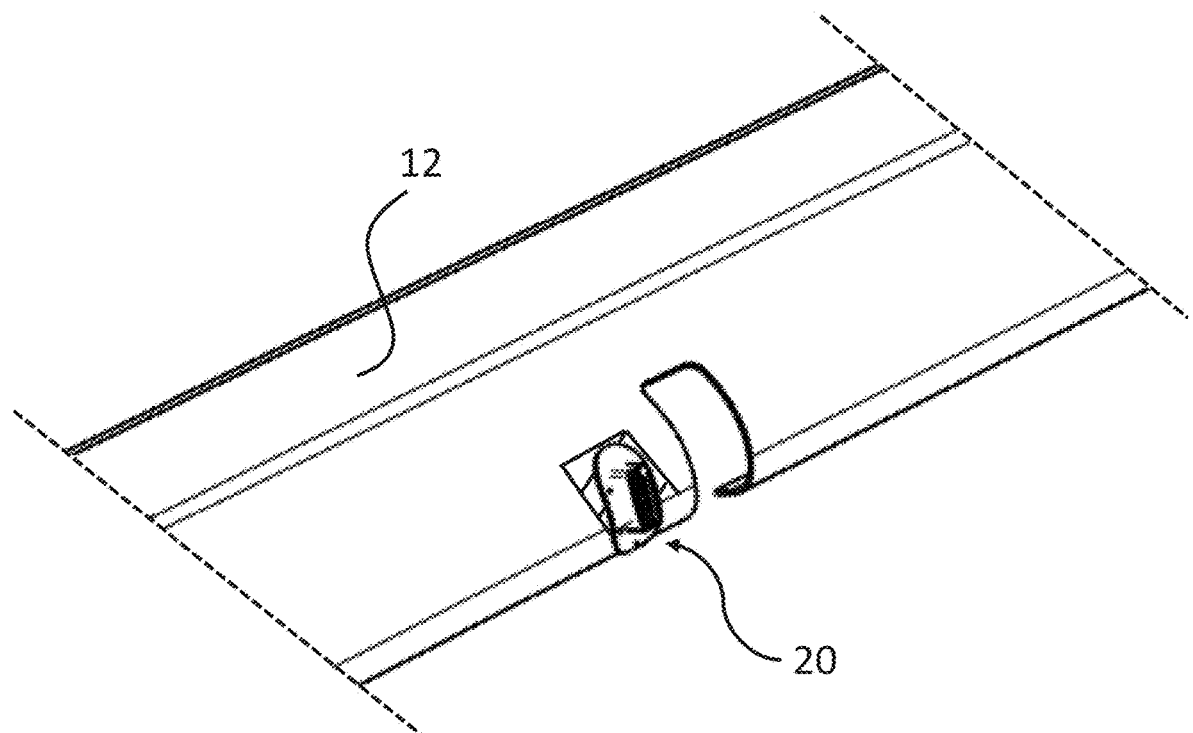
FIG. 3 shows a schematic view of the first configuration of the aircraft system of FIG. 1 with a flight control surface removed.

An aircraft system, generally designated 10, is shown schematically in FIGS. 1 to 4, and takes the form of an aircraft wing system. The aircraft wing system 10 comprises a fixed wing structure 12, and a flight control surface 14 movable between a first retracted position relative to the fixed wing structure 12, and a second deployed position relative to the fixed wing structure 12. The flight control surface 14 is shown in the retracted and deployed positions in FIGS. 1 and 2 respectively, and the aircraft wing system 10 is shown with the flight control surface 14 removed for clarity in FIGS. 3 and 4. The flight control surface 14 may comprise any of an aileron, a flap, a slat, an elevator, a rudder or the like.

The aircraft system 10 comprises a first electrical component 16 housed within the fixed wing structure 12, a second electrical component 18 housed within the flight control surface 14, and an electrical connector 20 for providing an electrical connection between the first 16 and second 18 components.

As shown in the figures, the first 16 and second 18 electrical components are taken to be a power source 16 and a heater 18. This may particularly be the case where, for example, a heater is required in the flight control surface 14 to prevent the build-up of ice in use. Although the power source 16 itself is depicted here as being within the fixed wing structure 12, it will be appreciated that in practice the power source 16 may be located within a further component of an aircraft, for example the fuselage of an aircraft, but that the connectors from the power source 16 may still extend through the fixed wing structure 12, and that the electrical connector 20 may still be utilised for such an example.

Figure 5:
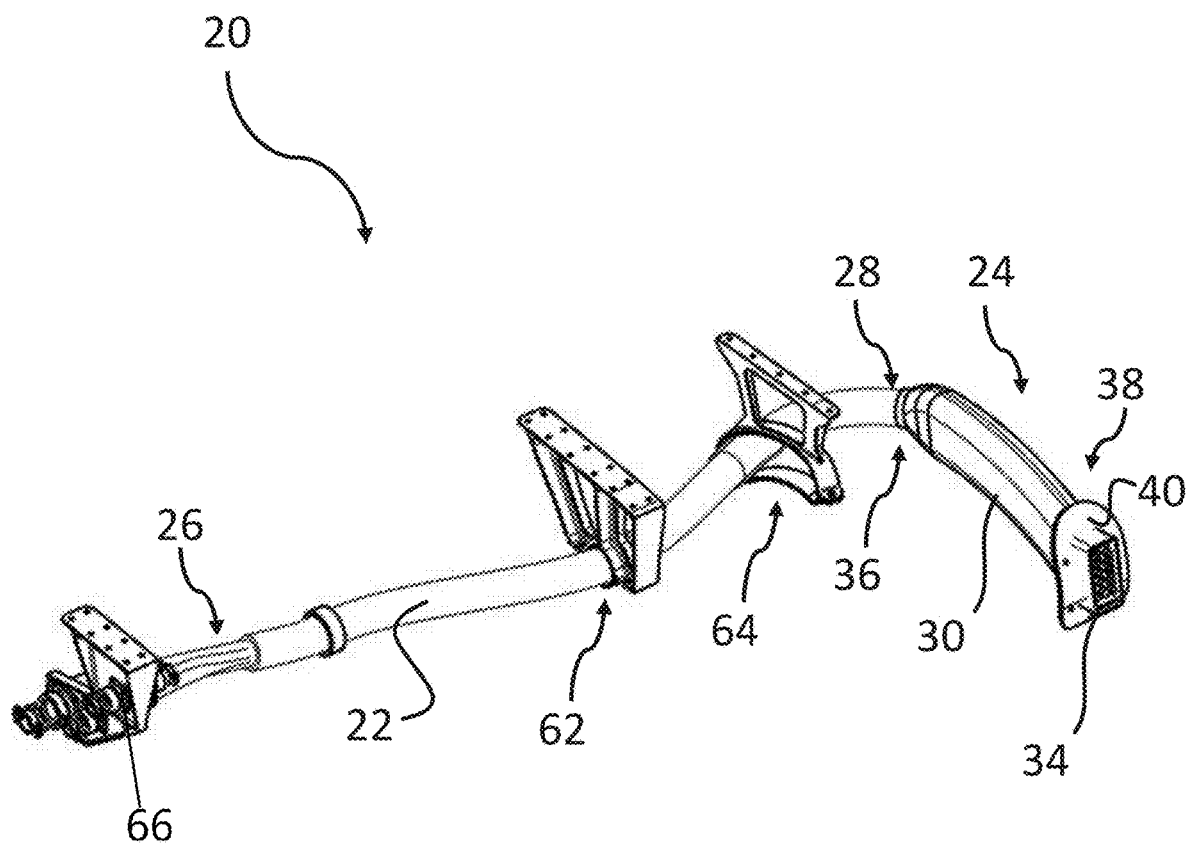
FIG. 5 shows a schematic view of an example of an electrical connector in isolation.

The electrical connector 20 is shown in isolation in FIG. 5, and comprises a cable harness 22 and a connector body 24. The cable harness 22 is a combined high voltage DC (HVDC) and signal harness, and carries both HVDC and signal cabling from the power source 16 to the connector body 24. As shown, a first end 26 of the cable harness 22 includes a coupling 66 that is coupled to the power source 16 by appropriate cabling, and a second end 28 of the cable harness 22 is coupled to the connector body 24. The cable harness 22 may be a conventional cable harness chosen appropriately for the aircraft wing system 10.

The connector body 24 comprises a composite shell 30, a structural foam core 32, and a connection portion 34.

The composite shell 30 is generally elongate in form, and is curved along its length between a first end 36 coupled to the second end 28 of the cable harness 2, and a second end 38 in the region of the connection portion 34. The curvature of the composite shell 30 substantially matches a curved range of motion between the flight control surface 14 and the fixed wing structure 12 as the flight control surface 14 moves between its retracted and deployed positions relative to the fixed wing structure 12. The composite shell 30 is rigid such that deflections due to aerodynamic loading and vibration may be reduced, and is a monolithic component.

The second end 38 of the composite shell 30 comprises a collar 40, with the collar 40 comprising a plurality of coupling points for coupling the composite shell 30 to an interior surface 44 of the flight control surface 14. In particular, the composite shell 30 extends through an aperture (not shown) in the flight control surface 14, such that the collar 40 is fixedly coupled to an interior surface 44 of the flight control surface 14 and the connection portion 34 is housed within the interior of the flight control surface 14. In such a manner the composite shell 30, and hence the connector body 24, may be supported at the second end 38 by the flight control surface 14.

A cross-sectional shape of the composite shell 30 between the first 36 and second 38 ends is an aerodynamic shape, for example an aerofoil shape. This aerodynamic shape of the composite shell 30 is exposed between the fixed wing structure 12 and the flight control surface 14 when the flight control surface 14 is in its deployed position relative to the fixed wing structure 12, and hence may provide aerodynamic benefits.

The cross-sectional shape of the composite shell 30 is also such that its height is greater than its width. This may minimise the extent to which the connector body 24 extends across the span of the fixed wing structure 12 and the flight control surface 14, which may save space for other components.

Figure 6:
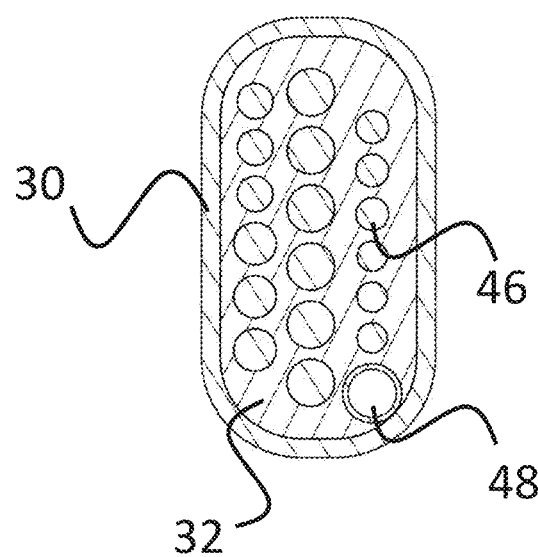
FIG. 6 shows a cross-sectional view taken along the line A-A of FIG. 5.

The structural foam core 32 is provided internally of the composite shell 30, as can be seen from FIG. 6, and defines an internal holding member. The structural foam core 32 comprises a plurality of channels 46, with each channel configured to receive a HVDC cable from the cable harness 22, and a plastic conduit 48 configured to receive signal cables from the cable harness 22. The structural foam core 32 may be any suitable structural foam core, for example a closed cell foam core. The structural foam core 32 holds HVDC and signal cables within the connector body 24 in use. An alternative internal holding member not shown here may take the form of a series of spacers or inserts housed within the composite shell 30. This may allow for the composite shell to be formed from more than one piece.

Figure 7:
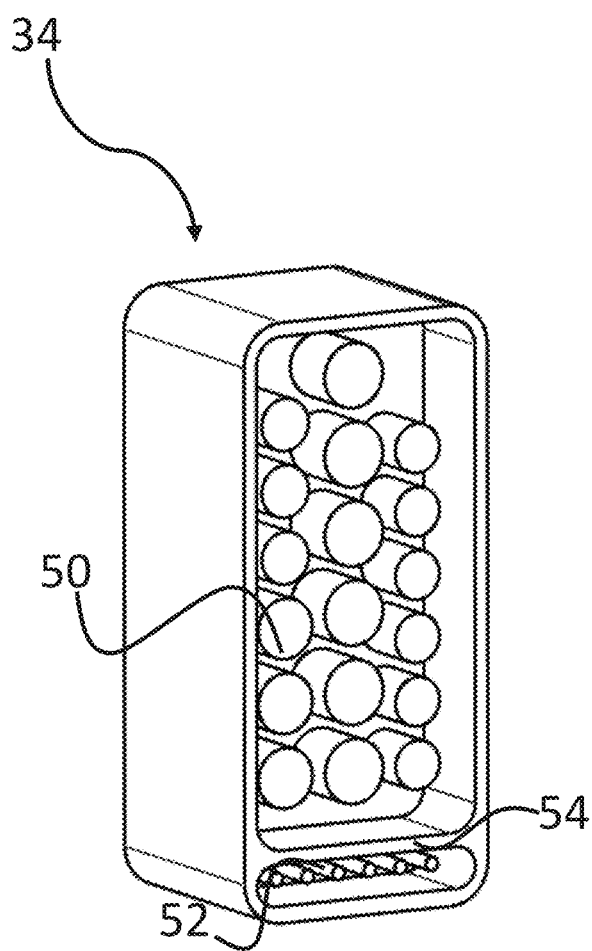
FIG. 7 shows a schematic view of a connection portion of the electrical connector of FIG. 5.

The connection portion 34 is disposed at the second end 38 of the composite shell 30, and extends from the composite shell 30 such that the connection portion is located within the interior of the flight control surface 14 in use. The connection portion 34 can be seen in more detail in FIG. 7. The connection portion 34 interfaces with HVDC cables held within the structural foam core 32, and comprises a plurality of output HVDC contacts 50 which interact with corresponding HVDC electrical contacts (not shown) of the heater 18. The connection portion 34 also interfaces with signal cables held within the structural foam core 32, and comprises a plurality of output signal contacts 52 which interact with corresponding signal contacts (not shown) of the heater 18.

The output HVDC contacts 50 and the output signal contacts 52 are located in different sections of the connection portion 34, with a physical barrier 54 between the output HVDC contacts 50 and the output signal contacts 52. This may provide appropriate electrical segregation at the connector level.

Figure 4:
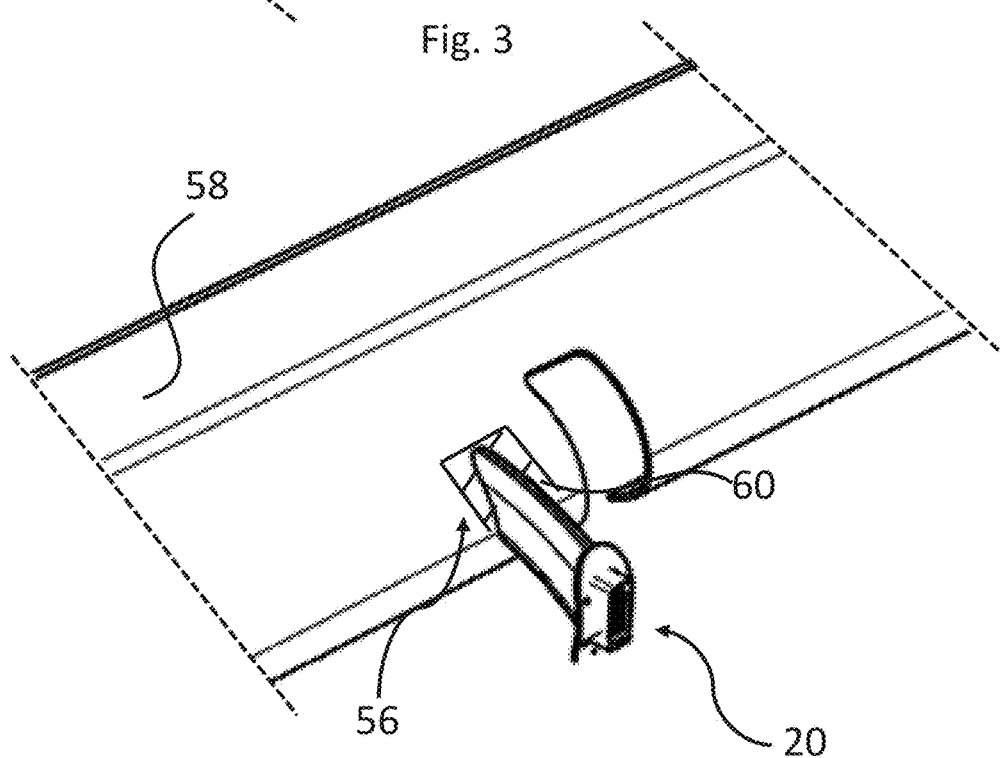
FIG. 4 shows a schematic view of the second configuration of the aircraft system of FIG. 2 with the flight control surface removed.

As can be seen from FIG. 4, the connector body 24 extends through an aperture 56 formed in an outer surface 58 of the fixed wing structure 12. A seal 60 is provided between the composite shell 30 and the aperture 56, and is indicated by hashed lines in FIG. 4. In some instances, the interface between the composite shell 30 and the aperture 56 may itself define the seal 60, but in other instances, as shown in FIG. 4, the seal 60 comprises a resilient material located between the composite shell 30 and the perimeter of the aperture 56. It will be appreciated that the size of the aperture 56 has been exaggerated for the sake of clarity, and that in practice the aperture 56 may have a size which closely matches an outer perimeter of the composite shell 30

The connector body 24 is not fixed to the fixed wing structure 12, such that the connector body 24 is slidable within the aperture 56. As previously mentioned, however, the second end 38 of the composite shell 30 is fixedly attached to the flight control surface 14. Thus, as the flight control surface 14 moves from its retracted position relative to the fixed wing structure 12 to its deployed position relative to the fixed wing structure 12, the connector body 24 is slidable through the aperture 56 between its own retracted position relative to the fixed wing structure 12 and its own deployed position relative to the fixed wing structure 12. This motion is illustrated schematically in FIGS. 1-4. As can be seen from FIGS. 3-4, in both the retracted and deployed positions of the flight control surface 14/connector body 24, the connector body 24 extends through the aperture 56. Thus, the cable harness 22 is not required to be exposed between the fixed wing structure 12 and the flight control surface 14 in use, which may remove design constraints for the cable harness 22.

Figure 8:
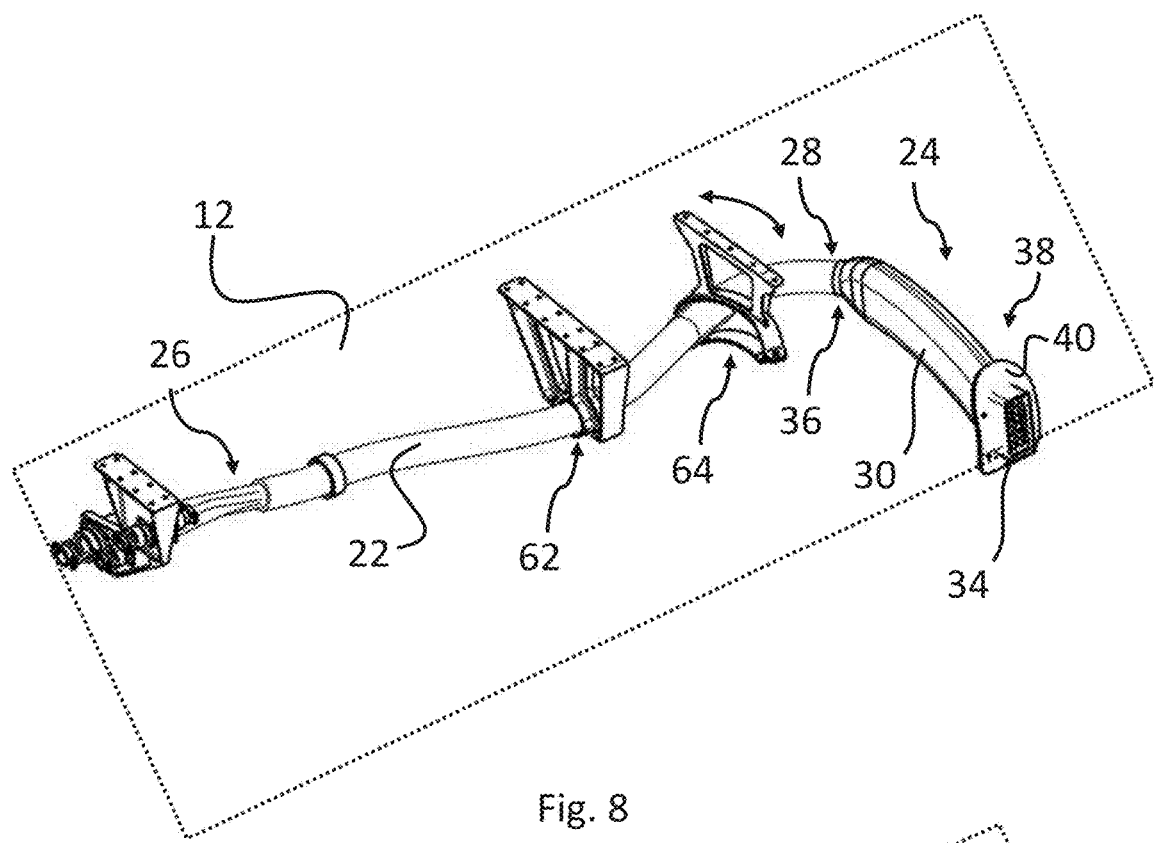
FIG. 8 shows a first schematic view of an interior of a fixed wing structure according to an example.
Figure 9:
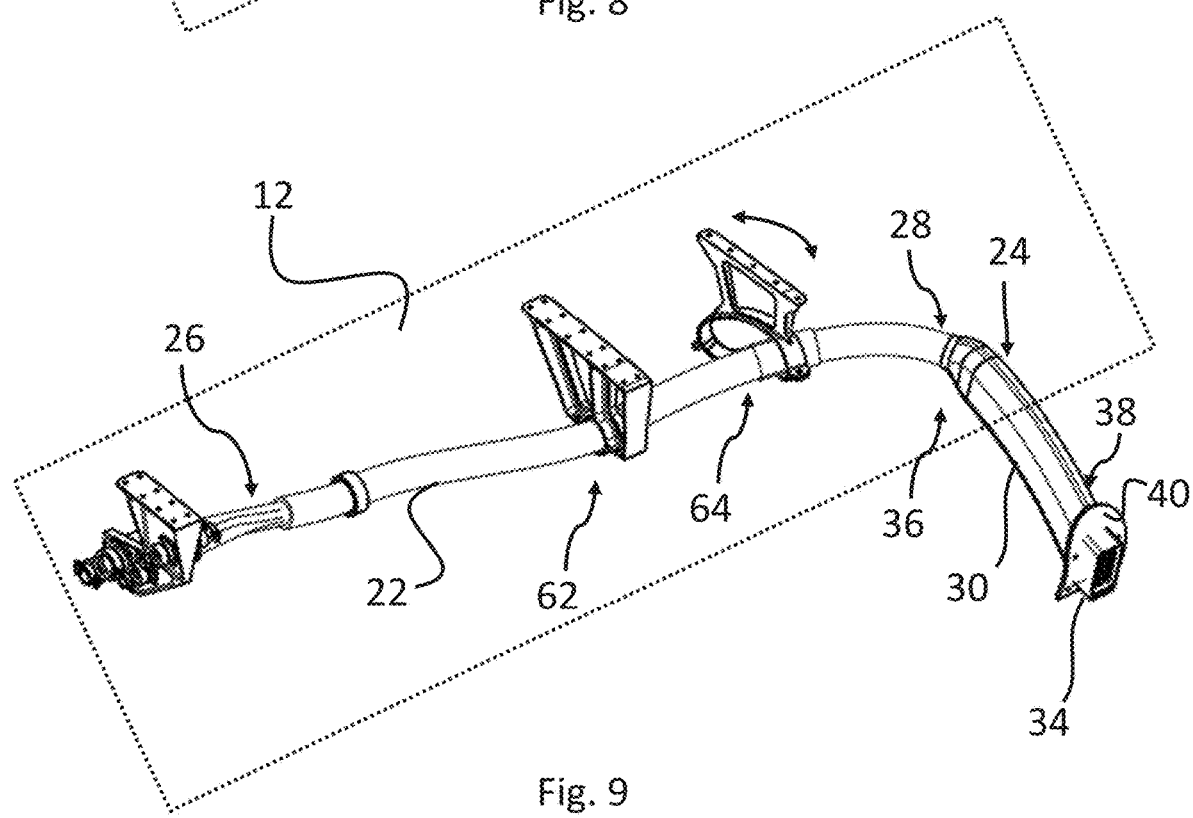
FIG. 9 shows a second schematic view of an interior of a fixed wing structure according to an example.

As illustrated schematically in FIGS. 8 and 9, motion of the cable harness 22 within the fixed wing structure 12 is limited by a fixation structure 62 and a guide 64 with the fixed wing structure 12 indicated by dotted lines.

The fixation structure 62 takes the form of an annular loop fixed within the fixed wing structure 12 by a bracket. The inner diameter of the fixation structure 62 is chosen to correspond substantially to an outer diameter of the cable harness 22, and the cable harness 22 is held within the fixation structure 62 such that motion of the cable harness 22, particularly in vertical and front-back directions (i.e. not necessarily in the span direction) of the fixed wing structure 12 is limited. The fixation structure may ensure that the cable harness 22 does not extend within the fixed wing structure 12 unsupported to too great an extent, and hence may prevent potential clashes with further components housed within the fixed wing structure 12 in use.

The guide 64 is located between the fixation structure 62 and the second end 28 of the cable harness 22 that is attached to the connector body 24. The guide 64 also takes the form of a full loop fixed within the fixed wing structure 12, but unlike the fixation structure 62, the guide 64 defines a track which enables motion of the cable harness 22 in both a front-back direction, for example a direction between a frontward facing surface and a rearward facing surface of the fixed wing structure 12 when installed on an aircraft 100, and a vertical direction (i.e. not necessarily in the span direction) of the fixed wing structure 12. Thus, in use, the guide 64 may enable the cable harness 22 to sweep, to a limited extent, within the fixed wing structure as the flight control surface 14 and the connector body 24 move between their retracted and deployed positions. This sweep of the cable harness 22 can be seen schematically in FIGS. 8 and 9. This may help to encourage a smooth transition of the cable harness 22 when the flight control surface 14 and the connector body 24 move between their retracted and deployed positions, and may prevent excessive harness bending in use, which may be particularly problematic with HVDC cables that have a relatively low flexibility. The degree of motion afforded by the guide 64 may match movement of the flight control surface 14 relative to the fixed wing structure 22 for example with the shape of the guide 64 matching the shape of motion of the flight control surface 14 relative to the fixed wing structure 22. This may minimise vertical bending of the cable harness 22 during motion of the flight control surface 14 in use.

As well as allowing for sweep of the harness 22 within the fixed wing structure 12, the guide 64 may ensure that the cable harness 22 does not extend within the fixed wing structure 12 unsupported to too great an extent, and hence may prevent potential clashes with further components housed within the fixed wing structure 12 in use.

A low-friction bushing (not shown) may be provided between the cable harness 22 and the guide 64.

Figure 10:
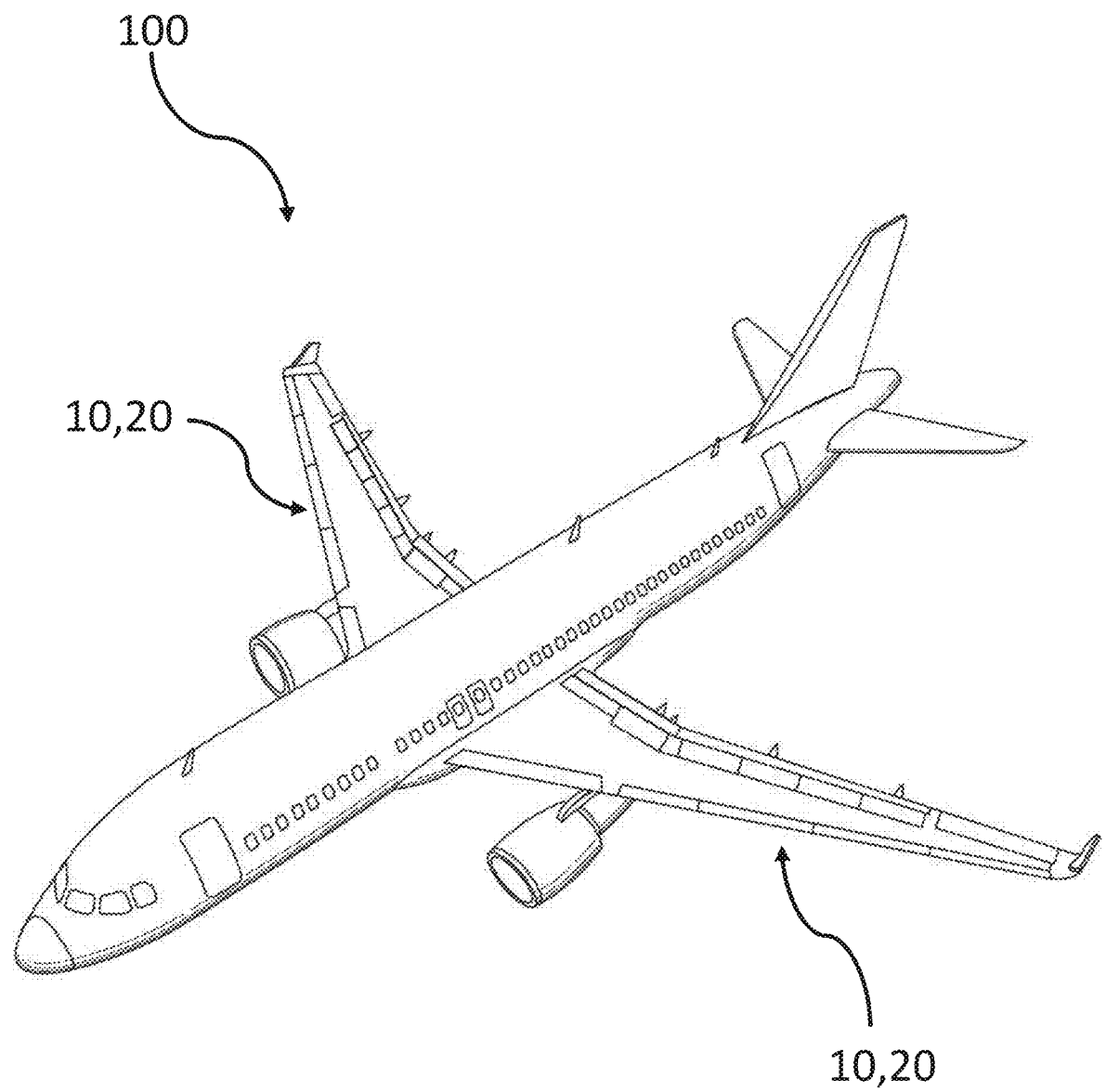
FIG. 10 shows a schematic view of an aircraft according to an example.

An aircraft 100 comprising the aircraft wing system 10 and electrical connector 20 is illustrated schematically in FIG. 10.

Although shown herein as an electrical connector 20 providing an electrical connection between respective components housed within a fixed wing structure 12 and a flight control surface 14, it will be recognised that the electrical connector 20 may also find utility for any appropriate aircraft system where there are fixed and movable structures.

It will also be appreciated that features described in relation to the figures are examples only, and that alternatives may be used where appropriate.

For example, although the composite shell 30 is described above as extending through an aperture in the flight control surface 14, in other examples the composite shell 30 may be attached to an exterior surface of the flight control surface 14 whilst the connection portion 34 extends through an aperture in the flight control surface. Furthermore, the composite shell 30 may not necessarily be curved, and may instead be straight in form. Whilst described herein as a heater, the second electrical component 18 in other examples may comprise lights, or sensors such as pressure sensors. It will further be appreciated that the electrical connector 20 may only carry power, or may only carry signals, as appropriate.

It is to noted that the term "or" as used herein is to be interpreted to mean "and/or", unless expressly stated otherwise.

The invention claimed is:

1. An aircraft system comprising a first structure, a second structure coupled to the first structure and movable between first and second positions relative to the first structure, and an electrical connector for providing an electrical connection running between respective components housed within the first and second structures, the electrical connector comprising:
   a cable harness housed within the first structure, wherein the cable harness includes cables extending through a sleeve of the cable harness, wherein the sleeve extends around the cables,
   a connector body joined to a first end of the cable harness, the connector body extending through an aperture formed in the first structure, and the connector body is fixedly coupled to the second structure, and
   a guide fixed to the first structure and configured to restrict motion of the cable harness in at least one plane of motion during movement of the second structure between the first position and the second position,
   wherein movement of the second structure between the first and second positions relative to the first structure causes the connector body to move through the aperture, and
   wherein the guide defines a channel within which the cable harness moves in translational movement in conjunction with the movement of the second structure between the first position and the second position.

2. The aircraft system as claimed in claim 1, wherein the aircraft system is configured so that the connector body follows a pre-defined path relative to the first structure when the second structure is moved between the first and second positions.

3. The aircraft system as claimed in claim 1, wherein the connector body comprises an outer shell that is a monolithic structure connected to the second end of the cable harness and extending to and into the second structure.

4. The aircraft system as claimed in claim 1, wherein the connector body comprises a rigid outer shell connected to the first end of the cable harness, wherein the rigid outer shell is directly connected to the first end of the cable harness and extends to and into the second structure.

5. The aircraft system as claimed in claim 1, wherein the connector body comprises an internal holding member configured to hold an electrical power cable.

6. The aircraft system as claimed in claim 1, wherein at least a portion of the connector body is exposed between the first structure and the second structure when the second structure is in the second position.

7. The aircraft system as claimed in claim 1, wherein the connector body comprises an aerodynamic shape that is exposed when the second structure is in the second position.

8. The aircraft system as claimed in claim 1, wherein the guide is between the first end and a second end of the cable harness and the guide is nearer along the length of the cable harness to the first end of the cable harness than the second end of the cable harness.

9. The aircraft system as claimed in claim 1, wherein the connector body is curved, and a curvature of the connector body corresponds to a range of motion of the second structure as the second structure moves between the first position and the second position.

10. The aircraft system as claimed in claim 1, wherein the connector body is slidable through the aperture.

11. The aircraft system as claimed in claim 1, wherein the aircraft system comprises a seal between the connector body and the first structure.

12. The aircraft system as claimed in claim 1, wherein the connector body has a height and a width, wherein the height is greater than the width, with the height and the width being substantially perpendicular to a path along which the connector body moves during motion through the aperture.

13. The aircraft system as claimed in claim 1, wherein the aircraft system comprises a power cable and a data cable that run through the cable harness and the connector body.

14. The aircraft system as claimed in claim 1, wherein the connector body comprises a connection portion comprising a plurality of different connection types.

15. The aircraft system as claimed in claim 1, wherein the first structure comprises a fixed wing structure, the second structure comprises a flight control surface coupled to the fixed wing structure, and the first position and the second position of the second structure are retracted and deployed positions of the flight control surface.

16. The aircraft system as claimed in claim 1, wherein the second structure comprises a heating device, and the electrical connector provides an electrical connection from the first structure to the heating device.

17. The aircraft system of claim 1, wherein the cable harness has a longitudinal axis oblique to a longitudinal axis of the connector body,
   wherein a joint, within the first structure, joins the connector body to the first end of the cable harness, and
   wherein the joint moves towards and away from the aperture in the first structure during the movement of the second structure between the first position and the second position.

18. An aircraft system comprising:
   a first body,
   a second body coupled to the first body and movable relative to the first body, and
   an electrical connector configured to provide an electrical connection between components respectively housed within the first body and the second body,
   wherein the electrical connector includes:
      a harness housed within the first body, wherein the harness includes cables and a sleeve through which extends the cables;
      a connector joined to a first end of the harness,
      an electrical power cable extending through the harness and the connector, and
      a guide within and fixed to the first body and configured to restrict motion of the harness in at least one plane of motion during movement of the second body between the first position and the second position,
      wherein the electrical connector extends between the first body and the second body, the electrical connector is fixedly coupled to the second body, and
      wherein the electrical connector is moved relative to the first body when the second body is moved relative to the first body, and
      wherein the guide defines a channel within which the harness moves in translational movement in conjunction with the movement of the second structure between the first position and the second position.

19. The aircraft system of claim 18, wherein the harness has a longitudinal axis oblique to a longitudinal axis of the connector body,
   wherein a joint, within the first body, joins the connector body to the first end of the cable harness, and
   wherein the joint moves towards and away from the aperture in the first structure during the movement of the second structure between the first position and the second position.

20. An aircraft flight control surface electrical connector configured to electrically connect a first component within an aircraft flight control surface to a second component within a fixed wing structure, the aircraft flight control surface electrical connector comprising:
- a harness configured to be located within the fixed wing structure, wherein the harness includes cables extending through the harness and a sleeve at least partially covering the cables,
- a connector body joined to an end of the harness and fixedly couplable to the aircraft flight control surface,
- an electrical power cable extending through the harness and the connector body, and
- a guide within and fixed to the fixed wing and configured to restrict motion of the cable harness in at least one plane of motion during movement of the flight control surface relative to the fixed wing, and
- wherein the guide defines a channel within which the harness moves in translational movement in conjunction with the movement of the second structure between the first position and the second position.

* * * * *